2 Sheets—Sheet 1.

D. H. DOTTERER.

Car-Axle Box.

No. 1,352. Reissued Nov. 4, 1862.

Witnesses:

Godwin Wolfe

Gustavus Dietrich

Inventor:

D. H. Dotterer

2 Sheets—Sheet 2.

D. H. DOTTERER.

Car Axle-Box.

No. 1,352. Reissued Nov. 4, 1862.

Witnesses:

Goodwin & Kee

Gustavus Dieterich

Inventor:

D. H. Dotterer

UNITED STATES PATENT OFFICE.

DAVIS H. DOTTERER, OF CHICAGO, ILLINOIS.

IMPROVEMENT IN JOURNAL-BOXES.

Specification forming part of Letters Patent No. 32,243, dated May 7, 1861; Reissue No. 1,352, dated November 4, 1862.

*To all whom it may concern:*

Be it known that I, DAVIS H. DOTTERER, of the city of Chicago, in the county of Cook and State of Illinois, late of Memphis, in the county of Shelby, and State of Tennessee, have invented certain new and useful Improvements in Rail Car Journal-Boxes; and I do hereby declare that the following is a full, clear, and exact description of the same, reference being had to the accompanying drawings, forming a part of this specification, in which—

Figure 1:
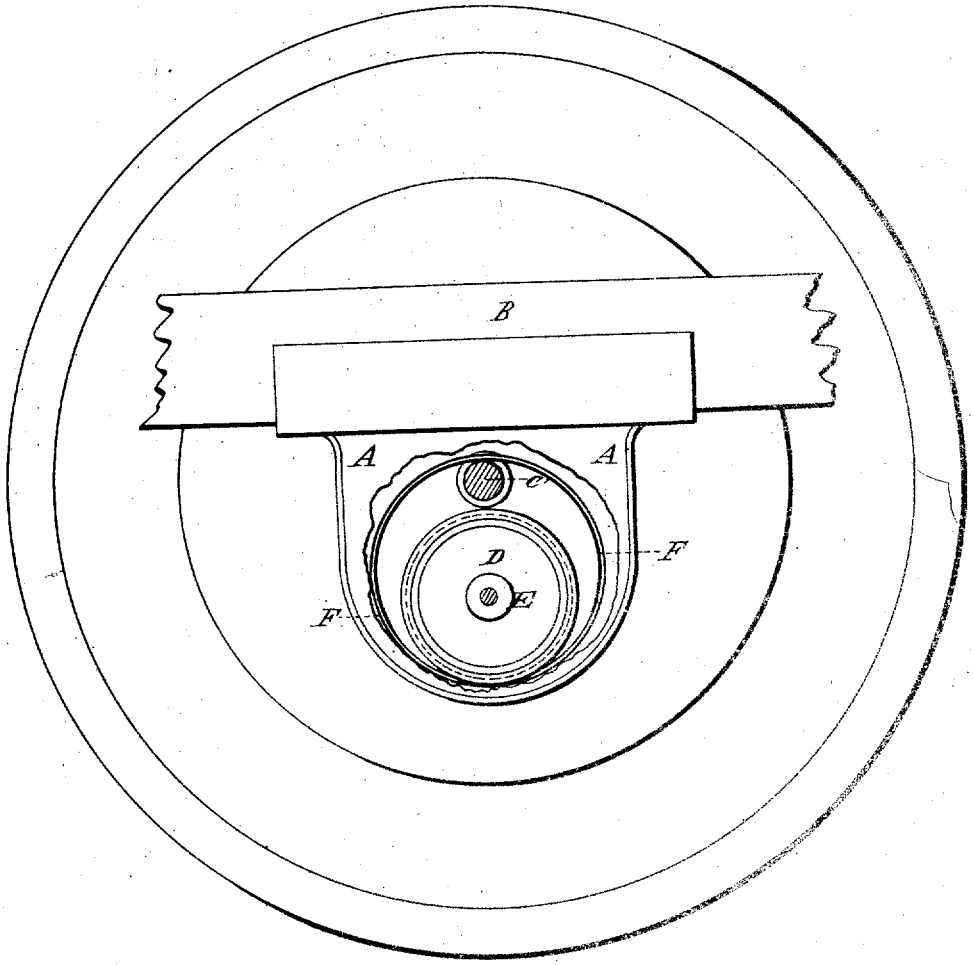
Figure 4:
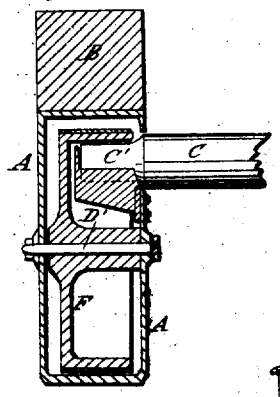
Figure 2:
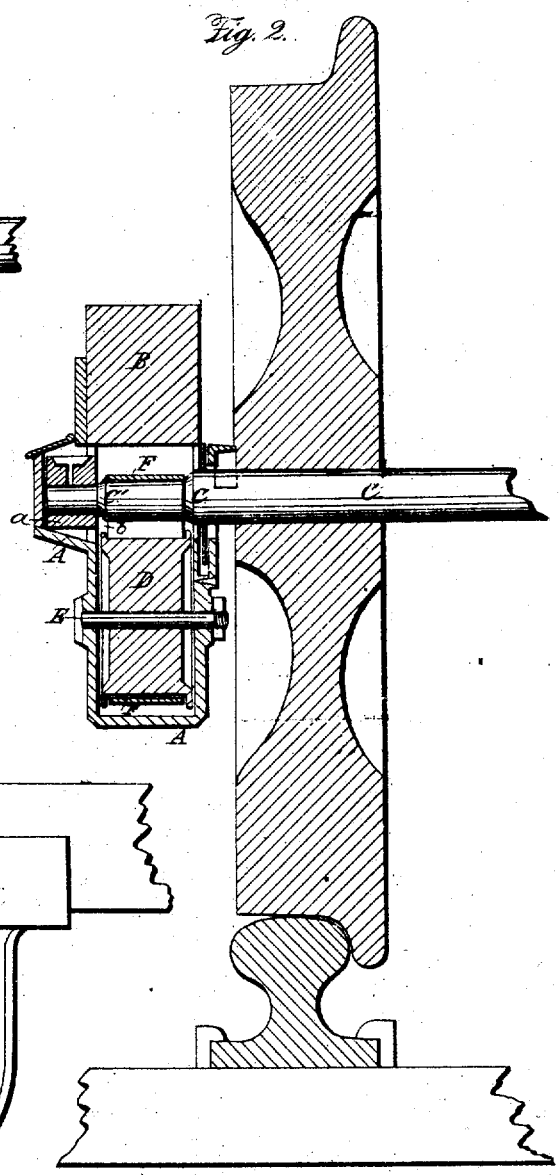
Figure 3:
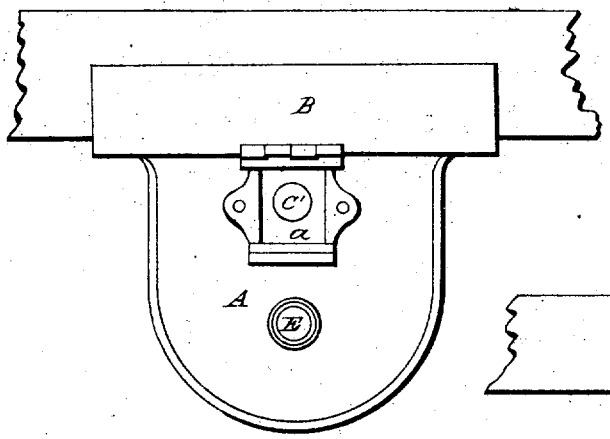

Figure 1 is a sectional end view of my improved journal-box. Fig. 2 is a longitudinal section of the same, and Fig. 3 an end elevation with the end-plate of the end-bearing portion of the journal-box removed.

The nature of my invention consists, first, in providing in journal-boxes an endless revolving band or ring for the purpose of sustaining the weight resting on railroad-car axles; also, for the purpose of reducing the friction on axles induced by the weight supported, and likewise for elevating the lubricating or cooling material from the bottom of the journal-box, to the upper side of the axle journals; and, further, for the purpose of forming a spring-cushion for the axle-journals.

It consists, second, in certain means for supporting in the journal-box the endless band or ring, said means being a combination of a pin and sheave.

It consists, third, in an auxiliary box for steadying the end of the journal sidewise and endwise, and also for lubricating the ends of the journal.

The same letters of reference in the several figures indicate corresponding parts.

In the drawings, A represents the shell of a railroad-car journal-box, and D a bonnet hinged to the top of the journal-box and covering the charge-hole of the same.

F is a dust and dirt hood overhanging the cylindric or nearly cylindric opening G of the journal-box.

H is a sliding packing-plate, with a hole, $b'$, in it, and fitted in grooves $c$ $c$, near the inner end of the journal-box.

I is a vertically-sliding end bearing for the axle, and is arranged within the chamber C′ of the journal box, and suitably fitted to the partition K thereof, as shown.

By reference to the drawings it will be seen that the outer end of the axle-journal C is formed with a shoulder, $b$, and that said outer end has its support or bearing in the vertically-sliding block I. By thus forming the shoulder $b$ on the journal the necessity of having a collar at the point $c$ is obviated, and thus much of the friction and wear usually experienced at point $c$ is prevented. The end bearing, I, is provided with an oil-passage down through it to the journal C, so that oil may be applied to that part, as clearly indicated in Fig. 2.

J, Figs. 1 and 2, is a sheave or pulley arranged and hung within the lower contracted portion, A′, of the journal-box, on an axial pin $j$, which is directly under the journal of the axle, as represented.

M is an endless cylindric metallic ring placed around the pulley J, and extends up high enough to admit the journal C, of the axle $M^2$ where said journal enters the journal-box. This band or ring occupies the space between the partition H and the inner side of the journal-box, as shown, and its offices are to sustain the weight of the car or other object bearing on the axle and to elevate the lubricating material from the journal-box to the wearing part of the journal, as well as the additional one of in a degree serving as a spring, or slightly yielding under the pressure of the car, while at the same time it is made of such strength as to resist all tendency to be permanently altered in form by reason of such pressure.

The journal-box is supplied with water, oil, or other cooling or lubricating substance through the charge-hole covered by the cap D. The journal of the axle enters the opening on the inner side of the box and finds its bearing within the upper portion of the circle of the endless band or ring, and in the sliding end piece, I, and as the car moves its weight rides on the said ring and axial pin $j$, and therefrom is transmitted to the axle, and consequently much friction would be induced; but, as this ring revolves, the wearing action of this friction is reduced, and its heating and injurious effects are to a great degree overcome by the elevation through the rotation of the ring of the lubricating material upon the heated portion of the axle.

It should be observed that in the hanging of the box provision is made for the rising and descending of the axle-journal and the end piece in which it bears, when, by reason of jolting, such movements take place.

The advantages of my invention may be stated as follows, viz: great reduction of friction, substitution of water for oil as a lubricator, saving in the consumption of "waste" used in packing old form of boxes, dispensing with the use of expensive composition metals, preventing undue heating of the journals, and saving labor and attention in renewing, oiling, and packing old kinds of boxes.

Having thus described my invention, what I claim as new, and desire to secure by Letters Patent of the United States, is—

1. Providing in journal-boxes an endless revolving band or ring, M, substantially as and for the purposes described.

2. The sheave J and axial pin *j*, for supporting the upward thrust on the endless revolving band or ring M within the journal-box, substantially as described.

3. The auxiliary end bearing, I, for the axle-journal, substantially as described.

DAVIS H. DOTTERER.

Witnesses:
P. L. SHERMAN,
J. W. BOYDEN.